United States Patent [19]

Lewis

[11] 4,226,891

[45] Oct. 7, 1980

[54] TREATMENT OF ROBUSTA COFFEE

[75] Inventor: Neal A. Lewis, Mason, Ohio

[73] Assignee: The Procter & Gamble Company, Cincinnati, Ohio

[21] Appl. No.: 965,006

[22] Filed: Nov. 30, 1978

Related U.S. Application Data

[63] Continuation of Ser. No. 909,247, May 24, 1978, abandoned, which is a continuation of Ser. No. 764,933, Feb. 2, 1977, abandoned.

[51] Int. Cl.$^3$ ............................................. A23F 5/16
[52] U.S. Cl. .................................... 426/430; 426/595
[58] Field of Search ............... 426/594, 595, 424, 425, 426/428, 429, 430, 486

[56] References Cited

U.S. PATENT DOCUMENTS

| | | | |
|---|---|---|---|
| 431,278 | 7/1890 | Nellensteyn | 426/486 |
| 2,481,470 | 9/1949 | Cohen | 426/430 |
| 2,494,928 | 1/1950 | Cohen | 426/386 |
| 2,615,905 | 10/1952 | Forstemann | 426/430 |
| 2,817,588 | 12/1957 | Barch | 426/428 |
| 3,840,684 | 10/1974 | Fazzina | 426/428 |

*Primary Examiner*—Joseph M. Golian
*Attorney, Agent, or Firm*—Rose Ann Dabek; Donald E. Hasse; Richard C. Witte

[57] ABSTRACT

A process for preparing a substantially non-decaffeinated Robusta coffee having improved aroma and flavor by contacting the roasted coffee with a non-chlorinated organic solvent system comprising a major portion of acetone and having a boiling point below about 200° F. for from about 1 to about 20 minutes, and an improved roast and ground coffee and coffee blend made thereby.

13 Claims, No Drawings

TREATMENT OF ROBUSTA COFFEE

This application is a continuation of application Ser. No. 909,247, filed May 24, 1978, now abandoned, which was a continuation of application Ser. No. 764,933, filed Feb. 2, 1977, now abandoned.

BACKGROUND OF THE INVENTION

This invention relates to the removal of undesirable aroma and flavor components from low priced varieties of coffee, primarily the Robustas.

There are basically two major botanical varieties of coffee, *Coffea Arabica* and *Coffea Canephora*. The variety *Coffea Canephora* includes the Robusta coffees, whose quality is generally considered to be lower than that of the Arabica coffees. The Robusta coffees are grown primarily in Africa, Indonesia and Ecuador, and are relatively inexpensive.

There are a number of Arabica coffee varieties, which are generally divided into two major groups, "Brazils" and "Milds." "Milds" are somewhat loosely classified as coffees other than Brazils and Robustas. The "Milds" are grown primarily in Columbia, Central America and the mountains of East Africa and Kenya. They are considered to be premium coffees, and are priced accordingly. Two-thirds of the world's commercial coffee beans are of the *Coffea Arabica* variety.

Robusta coffees generally produce a strong tasting coffee beverage with good body, but with peculiar, offensive taste and aroma characteristics, which have been described as earthy, bitter, tarry, or rubber-like.

A major reason for the low cost of the Robusta coffees is their bitterness and their unpleasant aroma when brewed. Robustas contain about twice as much caffeine as Arabicas, but this is not the sole reason for their bitterness. The odor sensation that occurs in the nasal passages when the coffee is brewed, smelled, inhaled or ingested is the primary reason for rejecting the Robustas as being a "good cup of coffee." For an analysis of the flavor characteristics of the Robustas and the "Milds," see the Tea and Coffee Trade Journal, 122, 30-36 (1962).

Robusta coffees are almost never used by themselves as roast and ground coffees, but are often blended with Arabicas to provide body and for economic reasons. Because of the taste and aroma of the Robusta coffees, they generally comprise no more than about 15% to 25% of roast and ground coffee blends. Instant coffees typically contain somewhat more Robusta than do roast and ground blends.

It is an object of this invention to improve the flavor of roast and ground coffee, especially low grade coffees of the Robusta variety, by removing the objectionable tarry, earthy and bitter flavor notes.

It is also an object of this invention to improve the aroma and flavor of a beverage made from roast and ground Robusta coffee beans.

Still another object of this invention is to produce an economical roast and ground coffee blend containing a major portion of Robusta coffee and a minor portion of Arabicas, and which has a taste comparable to more expensive coffee blends containing a minor portion of Robustas and a major portion of Arabicas.

These and other objects are achieved herein as will be seen from the following disclosure.

SUMMARY OF THE INVENTION

The present invention encompasses a process for preparing an improved, substantially non-decaffeinated Robusta coffee by contacting roasted Robusta coffee beans which have been ground or otherwise comminuted with a non-chlorinated organic solvent system comprising a major portion of acetone and having a boiling point below 200° F. for from about 1 to about 20 minutes, and then removing the solvent from contact with the coffee. A substantially non-decaffeinated Robusta coffee having improved aroma and flavor is produced by this process. Robusta coffee treated in the foregoing manner can be used alone or in a coffee blend comprising up to about 80% by weight of Robusta coffee beans and as low as about 20% by weight of Arabica coffees.

All percentages herein are by weight, unless otherwise specified.

As used herein, "solvent system" means a non-chlorinated, organic solvent which can comprise the single component, acetone, or a mixture comprising a major portion (>50%) of acetone and a minor portion (<50%) of acetone-compatible liquid materials, which exists as a single phase at the temperature of the process, and which has a boiling point below about 200° F. The solvent system should be substantially anhydrous, i.e., contain less than ca. 10% water.

DETAILED DESCRIPTION OF THE INVENTION

Low priced coffee, primarily Robusta coffees from Africa and Indonesia, are not used extensively in roast and ground coffee or coffee blends because they contain objectionable flavors and aromas. This invention provides a method for greatly reducing the undesirable aroma impact and flavor characteristics of Robusta coffees, thereby making them acceptable for use in making beverages.

In the practice of this invention, low cost coffee beans of the species *Coffea Canephora,* especially Robustas, are roasted in any conventional manner. Any standard commercial roasting operation is acceptable for the practice of this invention. A steam roasting process such as that described by Bolt, et al., U.S. Pat. No. 3,640,726 (1972) incorporated herein by reference, which, itself, helps to improve the flavor of Robusta coffees, is useful in the practice of this invention.

In a more conventional and fully acceptable mode, the Robusta coffee beans are roasted in standard fashion in a dry atmosphere by exposing the beans to air at a temperature ranging from about 300° F. to about 700° F. for a time period ranging from about 5 minutes to about 20 minutes. Typical roasting equipment and methods for roasting coffee beans which can be employed herein are described, for example, in Sivetz and Foote, *Coffee Processing Technology,* Avi Publishing Company, Connecticut, 1963, Vol. 1, pp. 203-226, the disclosures of which are incorporated herein by reference.

Once the steam roasting or dry roasting of the Robusta coffee beans has been carried out, the roasting process is stopped by quenching the hot beans with cold water, and/or with liquid nitrogen, or by conveying them into a cooling vessel, all in standard fashion.

The cooled, roasted Robusta beans are then ground to a suitable grind size, depending on the end use of the product. A grind size from on 12 mesh U.S. Standard Sieve Series to on 60 mesh U.S. Standard Sieve Series can be used. Suitable methods and apparatus for grinding coffee beans are disclosed in Sivetz and Foote, supra, pages 239–250.

Most roast and ground coffees are mixtures of different grind sizes. A regular grind coffee contains a mixture of from 20%–35% of on 12 and on 16 mesh, 50%–60% of on 20 and on 30 mesh and 5%–20% through 30 mesh. A typical drip grind coffee can contain from 5%–15% of on 12 and on 16 mesh, 65% to 80% on 20 and on 30 mesh and 15%–30% through 30 mesh. The brewing ultimately to be used determines the mixture of grind size.

To improve the flavor and aroma in the manner of this invention, the roast and ground Robusta coffee beans are then contacted with the non-chlorinated organic solvent system comprising a major portion of acetone and having a boiling point below 200° F. Other slightly polar solvents such as diethyl ether and ethyl acetate are useful for removing the undesirable aroma and flavor from the Robusta coffee beans, but they tend to occlude to the roast and ground coffee. This solvent residue presents both organoleptic and toxicological problems. Accordingly, such "occlusive" solvents are preferably avoided in the solvent system herein.

Mixtures of acetone and low molecular weight alcohols having from 1 to 3 carbon atoms are useful in the practice of this invention. Especially preferred are mixtures of acetone and ethanol, 1-propanol or 2-propanol.

It is not necessary that the solvent system be totally anhydrous. One percent water in the solvent system does not adversely affect the process, and up to 10% water present in the solvent is acceptable.

The roast and ground Robusta beans can be simply sprayed with the solvent system. In more preferred modes, the roast and ground Robusta beans are mixed with the solvent, batchwise or in a continuous manner, at a weight ratio of coffee:solvent in the range of from 2:1 to about 1:5. The most preferred ratio is about 1 part by weight of roast and ground Robusta beans to about 1 part by weight of solvent.

The solvent extraction can conveniently be carried out at room temperature, or at temperatures of from about 0° F. to 130° F.

Any conventional extraction apparatus, such as a stirred tank reactor, extraction column, mixing vessel, or solvent percolation system, can be used. *Chemical Engineers' Handbook*, Perry, ed., (4th ed., 1963) at pages 17-2, 19-17 and 19-18 describes leaching apparatus which can be used in this process. The extraction is carried out for a shortened period of time, from about 1 minute to about 20 minutes. Preferably the contact time between the solvent system and the roast and ground Robusta coffee beans is from about 3 to about 5 minutes.

The very short contact time between the solvent system and the roast and ground Robusta coffee does not substantially decaffeinate the coffee. Solvent extraction to decaffeinate coffee requires a substantially longer contact time (usually hours) between the beans and solvent.

The solvent system is then separated from the roast and ground coffee beans by filtration, centrifugation, or any other conventional means. After the excess solvent has been removed, the roast and ground coffee beans are then subjected to a drying operation (evaporation) to remove any residual solvent. This drying operation can be carried out by warming the coffee, using forced air drying, or drying the coffee beans under vacuum. Indeed, any conventional solvent removal process which does not subject the roast and ground Robusta coffee to temperatures which would degrade or otherwise change their now-optimized odor and flavor characteristics can be used.

The preferred method of removing the residual solvent from the moist, solvent-treated roast and ground Robusta coffee beans is by vacuum drying the ground beans at pressures of from about 0.05 mm to about 300 mm and temperatures of from 50° F. to 110° F.

The solvent extraction process can be repeated to produce an even more bland Robusta coffee. However, repeated extractions do not represent a substantial improvement in the overall quality of the product since an overly-bland coffee is not desirable. In short, repeated extractions remove additional coffee solids without a concomitant improvement in the coffee flavor or aroma.

The solvent extraction removes undesirable aroma volatiles and some coffee solids, which are discarded. For economy, these extracted aroma and flavor materials are first removed from the solvent system, which can then be reused.

The substantially non-decaffeinated roast and ground Robusta coffee prepared by this process can be used in the conventional manner to prepare a coffee beverage. Any of the conventional brewing apparatus, e.g., percolator, drip coffee maker, and automatic coffee makers, can be used. The selection of brewing method determines the size of the grind. The resulting beverage has a less bitter, less burnt, and better overall flavor and aroma impression than one made with untreated Robusta roast and ground coffee.

In a highly preferred mode, the solvent-extracted, roast and ground Robusta coffee prepared by the above process is blended with the more mild varieties of coffee beans, i.e., the Brazilian Arabica beans, Ethopian Arabica beans, Columbian "Mild" coffee, or others, to provide a coffee product with more balanced flavor and aroma characteristics.

The Arabica coffee beans used for blending purposes herein are roasted, quenched, and ground to from about 12 mesh U.S. Standard Sieve Series to "on" 100 mesh U.S. Standard Sieve Series, in any conventional manner. The roast and ground "Brazils" and/or "Mild" beans are then mixed with the roast and ground Robusta coffee beans which have been solvent-extracted in the manner of the present invention.

Any ratio of solvent-extracted Robustas to Arabicas can be used herein for blend purposes, depending on the flavor desired. To produce a balanced flavor which is preferred by most coffee drinkers, a mixture of from about 15% to about 80% of substantially non-decaffeinated, solvent-extracted roast and ground Robusta coffee beans prepared in the manner of this invention and from about 20% to about 85% of the milder flavored beans, i.e., the *Coffea Arabica* varieties is used. For a more balanced flavor, the "Milds" and "Brazils" roast and ground beans can also be mixed. Thus, blends can contain Central American "Mild," Brazilian and Ethopian Arabica beans, along with some Columbian "Mild" coffees, The amount of the milder coffee components and the number of these components which are blended will depend upon the particular taste or flavor desired in the final product.

The blends can also be improved by using a finer grind of the Arabica coffees and a somewhat coarser grind of the solvent-extracted Robusta coffee prepared in the manner of this invention. The size of the grind will depend upon the method of beverage preparation, as noted above, as well as the aroma and flavor impact desired in the final product.

Highly preferred roast and ground coffee blends which are flavorful, aromatic and economical contain about 60% to 80% of the substantially non-decaffeinated improved Robusta roast and ground coffee prepared by this invention.

In another aspect of this invention, "culls" can be improved in aroma and flavor by this process. "Culls" are inferior coffee beans, either of the Arabica or Robusta variety, which are rejected during processing because of their physical or organoleptic properties, i.e., appearance, odor or flavor.

The "culls" are roasted using standard roasting procedures. They are then ground to a suitable grind size, depending upon the end use of the product. To improve the flavor and aroma in the manner of this invention, the roast and ground "culls" are then contacted with the acetone-based solvent system in the same manner used with the roast and ground Robusta coffee beans.

As with the Robustas, the very short contact time between the solvent system and the roast and ground "culls" (from about 1 minute to about 20 minutes) does not substantially decaffeinate these coffee beans. The aroma and the flavor of the "culls" is greatly improved, and they are then suitable for preparing a roast and ground coffee blend which is both flavorful and aromatic.

The following examples illustrate the practice of this invention but are not intended to be limiting thereof.

EXAMPLE I

50 Grams of roast and ground African Robusta coffee were roasted to a "standard" roast, quenched with liquid nitrogen, and cold ground to a "regular" grind. This roast and ground coffee was mixed with 50 grams of acetone. The mixture was agitated for about 3 to about 5 minutes, and the excess acetone was removed by filtration. The acetone moist coffee grounds were then placed under a vacuum of 1 to 10 mm mercury at 100°–105° F. temperature to remove any residual acetone. The resulting roast and ground Robusta coffee was not substantially decaffeinated.

Robusta coffee treated in the foregoing manner is characterized by a greatly reduced level of objectionable "tarry" notes in its aroma, and, when brewed, the resulting coffee beverage has an improved flavor.

When Indonesian Robusta coffee beans are used in the above process, a roast and ground coffee with improved aroma and flavor is produced.

The beverage prepared by brewing the roast and ground Robusta coffee prepared in the manner of Example I has a less bitter and less burnt taste than coffee brewed from untreated, roast and ground Robusta coffee beans.

When the acetone used in Example I is replaced by a mixture of 90% acetone and 10% ethanol, similar results are obtained.

EXAMPLE II

A roast and ground coffee blend was prepared by mixing 80% acetone extracted African Robusta coffee beans prepared in the manner of Example I, herein, with 20% of a mixture of Brazilian Arabica and Columbian Mild coffees.

When the coffee blend of Example II is used to prepare a coffee beverage, the flavor and aroma is similar to a roast and ground coffee blend containing 20% Robusta coffee beans and 80% mild and Arabica coffees, at a substantial cost savings.

EXAMPLE III

50 Grams of coffee beans which were "culled" from Robusta beans as being inferior are roasted to a "standard" roast, quenched with liquid nitrogen, and cold ground to a "regular" grind. This roast and ground coffee is mixed with 50 grams of acetone. The mixture is agitated for about 3 to about 5 minutes and the excess acetone was removed by filtration. The acetone-moist coffee grounds are then placed under vacuum of from 1 to 10 mm/mercury at 100°–105° F. temperatures to remove any residual acetone. The resulting roast and ground coffee is not substantially decaffeinated.

The coffee "culls" treated in the foregoing manner are characterized by a greatly reduced level of objectionable aroma, and when brewed, the resulting coffee beverage has an improved flavor.

What is claimed is:

1. A process for preparing an improved, substantially non-decaffeinated Robusta coffee comprising:
   (1) contacting roast and ground Robusta coffee beans with a single phase non-chlorinated organic solvent system having a boiling point below 200° F. and having less than about 10% water comprising a major portion of acetone and a minor portion of low molecular weight alcohol having from 1 to 3 carbon atoms, the weight ratio of beans:solvent system being in the range of from about 2:1 to about 1:5, for from about 1 minute to about 20 minutes; and
   (2) removing said solvent system from contact with said coffee.

2. A process according to claim 1 in which the roast and ground coffee comprises African Robusta beans.

3. A process according to claim 1 in which the roast and ground Robusta coffee beans are contacted with said solvent system for a period of from about 3 minutes to about 5 minutes.

4. A process according to claim 3 wherein the weight ratio of beans:solvent system is about 1:1.

5. A process according to claim 1 in which the alcohol is ethanol.

6. A process according to claim 1 in which the alcohol is 1-propanol.

7. A process according to claim 1 in which the alcohol is 2-propanol.

8. A process for preparing an improved, substantially non-decaffeinated coffee comprising:
   (1) contacting roast and ground coffee "cull" beans with a single phase non-chlorinated organic solvent system having a boiling point below 200° F. and having less than about 10% water comprising a major portion of acetone and a minor portion of low molecular weight alcohol having from 1 to 3 carbon atoms, the weight ratio of "cull" beans:solvent system being in the range of from about 2:1 to about 1:5, for from about 1 minute to about 20 minutes; and
   (2) removing the solvent system from contact with said coffee.

9. A process according to claim 8 in which the roast and ground "cull" beans are contacted with said solvent system for a period of from about 3 minutes to about 5 minutes.

10. A process according to claim 8 wherein the weight ratio of beans:solvent system is about 1:1.

11. A process according to claim 8 in which the alcohol is ethanol.

12. A process according to claim 8 in which the alcohol is 1-propanol.

13. A process according to claim 8 in which the alcohol is 2-propanol.

* * * * *